US010328339B2

(12) United States Patent
May et al.

(10) Patent No.: US 10,328,339 B2
(45) Date of Patent: Jun. 25, 2019

(54) INPUT CONTROLLER AND CORRESPONDING GAME MECHANICS FOR VIRTUAL REALITY SYSTEMS

(71) Applicant: SPECULAR THEORY, INC., Marina Del Rey, CA (US)

(72) Inventors: Morris D. May, Marina Del Rey, CA (US); Catherine Ryan Pulliam, Marina Del Rey, CA (US)

(73) Assignee: Specular Theory, Inc., Marina Del Rey, CA (US)

( * ) Notice: Subject to any disclaimer, the term of this patent is extended or adjusted under 35 U.S.C. 154(b) by 0 days.

(21) Appl. No.: 16/033,149

(22) Filed: Jul. 11, 2018

(65) Prior Publication Data

US 2019/0015739 A1    Jan. 17, 2019

Related U.S. Application Data

(60) Provisional application No. 62/531,199, filed on Jul. 11, 2017.

(51) Int. Cl.
| | |
|---|---|
| A63F 9/00 | (2006.01) |
| A63F 13/211 | (2014.01) |
| A63F 13/428 | (2014.01) |
| A63F 13/213 | (2014.01) |
| A63F 13/46 | (2014.01) |

(52) U.S. Cl.
CPC .......... *A63F 13/211* (2014.09); *A63F 13/428* (2014.09); *A63F 13/213* (2014.09); *A63F 13/46* (2014.09); *A63F 2300/8082* (2013.01)

(58) Field of Classification Search
None
See application file for complete search history.

(56) References Cited

U.S. PATENT DOCUMENTS

| | | | | |
|---|---|---|---|---|
| 7,001,272 | B2* | 2/2006 | Yamashita | A63F 13/06 463/31 |
| 8,870,655 | B2* | 10/2014 | Ikeda | A63F 13/06 463/36 |
| 8,888,593 | B2* | 11/2014 | Larsen | A63F 13/219 382/106 |
| 9,056,255 | B2* | 6/2015 | Song | A63F 13/24 |
| 9,773,486 | B2* | 9/2017 | Lopiccolo | G10H 1/361 |
| 2004/0063480 | A1 | 4/2004 | Wang | |
| 2005/0017454 | A1* | 1/2005 | Endo | G06F 3/016 273/317.1 |

(Continued)

*Primary Examiner* — Seng Heng Lim
(74) *Attorney, Agent, or Firm* — Sheppard Mullin Richter & Hampton LLP (57) ABSTRACT

Systems and methods for facilitating user interaction with a virtual environment are discussed herein. In various implementations, the virtual environment may comprise a virtual reality game and a visual depiction of an input device of a user. As the user moves an input device, the visual depiction of the input device may appear to move in the virtual environment to facilitate gameplay. For example, a series of images corresponding to different visual characteristics may appear to travel toward the user. A score for the user may be determined based on the number of the series of images the user is able to intercept by moving the input device such that the position of an image traveling toward the user corresponds to the end of the visual depiction of the input device having the same visual characteristic.

19 Claims, 9 Drawing Sheets

(56) References Cited

U.S. PATENT DOCUMENTS

| | | | |
|---|---|---|---|
| 2005/0096132 A1* | 5/2005 | Ueshima | A63F 13/08 463/37 |
| 2005/0176485 A1* | 8/2005 | Ueshima | A63F 13/10 463/4 |
| 2007/0111779 A1* | 5/2007 | Osnato | A63F 13/06 463/16 |
| 2007/0197290 A1* | 8/2007 | Ueshima | A63F 13/02 463/36 |
| 2007/0265075 A1* | 11/2007 | Zalewski | A63F 13/06 463/36 |
| 2008/0015017 A1* | 1/2008 | Ashida | A63F 13/02 463/37 |
| 2008/0113798 A1* | 5/2008 | Miyanaga | A63F 13/06 463/37 |
| 2008/0234023 A1* | 9/2008 | Mullahkhel | A63F 13/06 463/7 |
| 2008/0311969 A1* | 12/2008 | Kay | A63F 13/10 463/7 |
| 2009/0058850 A1* | 3/2009 | Fun | A63F 13/06 345/419 |
| 2009/0088250 A1* | 4/2009 | Carlson | A63F 13/06 463/37 |
| 2009/0093307 A1* | 4/2009 | Miyaki | A63F 13/06 463/37 |
| 2009/0318227 A1* | 12/2009 | Nakajima | A63F 13/02 463/35 |
| 2010/0004896 A1* | 1/2010 | Yen | A63F 13/06 702/153 |
| 2010/0029386 A1* | 2/2010 | Pitsch | A63F 13/12 463/35 |
| 2010/0087240 A1* | 4/2010 | Egozy | G10H 1/0016 463/7 |
| 2010/0151948 A1* | 6/2010 | Vance | A63F 13/06 463/43 |
| 2011/0034250 A1* | 2/2011 | Brandt | A61F 13/06 463/37 |
| 2012/0094730 A1* | 4/2012 | Egozy | A63F 13/12 463/7 |
| 2012/0302347 A1* | 11/2012 | Nicholson | A63F 13/24 463/37 |
| 2013/0203492 A1* | 8/2013 | Yum | A63F 13/06 463/31 |
| 2013/0309941 A1 | 11/2013 | Grossman | |
| 2014/0361956 A1* | 12/2014 | Mikhailov | H04N 13/271 345/8 |
| 2015/0331403 A1 | 11/2015 | Martinez | |
| 2015/0332450 A1 | 11/2015 | Marty | |
| 2016/0140764 A1* | 5/2016 | Bickerstaff | G02B 27/017 345/633 |
| 2016/0206957 A1* | 7/2016 | Goslin | A63F 13/428 |
| 2017/0084115 A1 | 3/2017 | Manning | |
| 2017/0087453 A1 | 3/2017 | Poisner | |
| 2017/0113134 A1 | 4/2017 | Barney | |

* cited by examiner

INPUT CONTROLLER AND CORRESPONDING GAME MECHANICS FOR VIRTUAL REALITY SYSTEMS

CROSS-REFERENCE TO RELATED APPLICATION

This application claims the benefit of U.S. Provisional Patent Application Ser. No. 62/531,199 filed Jul. 11, 2017, the entirety of which is hereby incorporated herein by reference.

FIELD OF THE INVENTION

The invention relates generally to virtual reality systems, and more particularly to an input controller, and corresponding game mechanics performed using the input controller, for virtual reality systems.

BACKGROUND OF THE INVENTION

The global market for Virtual Reality ("VR") hardware and software is growing at a rapid pace. Indeed, VR technology is increasingly used in a variety of sectors including, for example, entertainment, artistry and design, education, tourism and exploration, healthcare, real estate, and shopping. One of the main applications for VR is gaming. Many VR games are known.

Many VR systems include hand-held controllers that include joysticks, buttons, triggers, or other actuators that are manipulated by users in order to execute actions in a virtual environment. In some instances, there is little to no correspondence between the physical (or real-world) action of manipulating an actuator on a controller, and the resulting action in the virtual game environment. In other words, the action that occurs in the virtual environment does not mimic (or resemble) the action or input that the user makes with the controller to cause the action in the virtual environment. As such, the overall VR experience may feel less real to a user, thereby diminishing the game experience, and possibly causing the user to lose interest in a game.

These and other drawbacks exist with many input controllers currently used with VR systems.

SUMMARY OF THE INVENTION

The invention addressing these and other drawbacks relates to an input controller, and corresponding game mechanics performed using the input controller, for virtual reality systems.

The various objects, features, and characteristics of the input controller and system and/or method disclosed herein, as well as the methods of operation and functions of the related elements of structure and the combination of parts and economies of manufacture, will become more apparent upon consideration of the following description with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to an input controller, and corresponding game mechanics performed using the input controller, for virtual reality systems.

As used herein, "virtual reality" (VR) may refer to what is traditionally considered virtual reality and hybrids thereof. For example it may include aspects of augmented reality, augmented virtuality, mixed reality, diminished reality and/or other variations.

Further, while aspects of the invention may be described herein with reference to various VR games, it should be appreciated that any such examples are for illustrative purposes only, and are not intended to be limiting. The input controller described in detail herein may be used with non-gaming VR applications (e.g., exercise, training and simulation, and other non-game applications) in addition to any genre of VR game, without limitation. Also, the terms "user," "player," and "gamer," along with other similar descriptors, may be used herein interchangeably.

Figure 1:
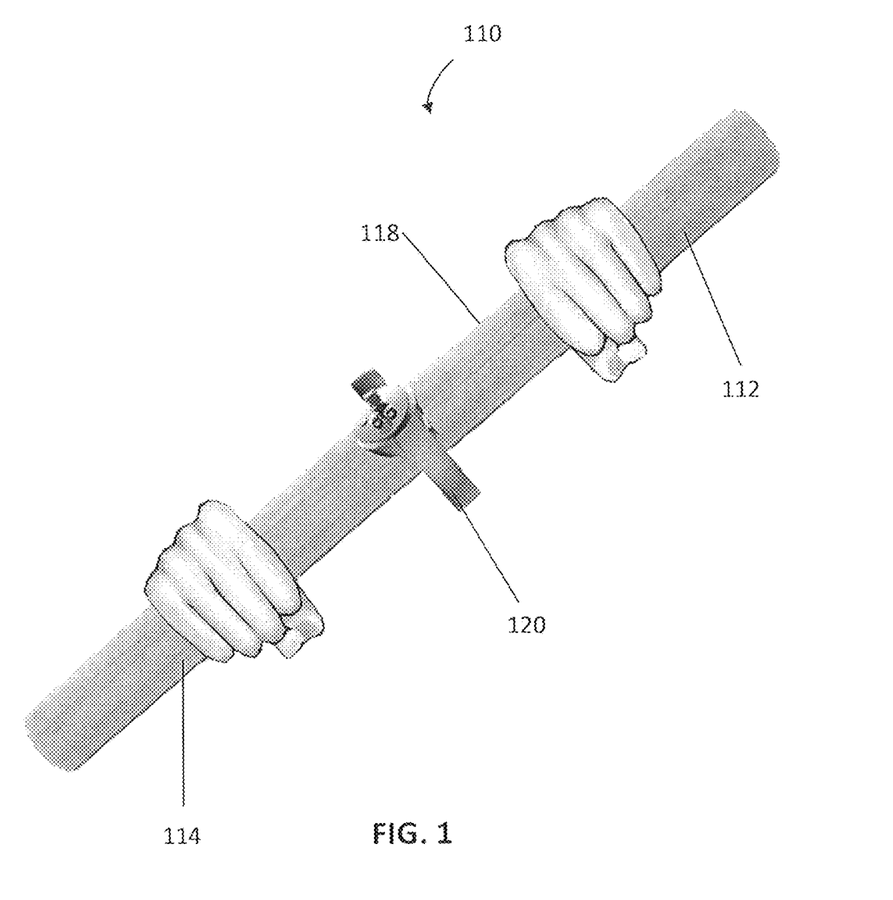
FIG. 1 is an exemplary illustration of an input controller for use with a VR system, according to an implementation of the invention.

With reference to FIG. 1, an input controller 110 (for use with a VR system) is shown. Input controller 110 may comprise an elongated physical object 118 and a VR controller 120 coupled thereto (described in greater detail below).

According to an aspect of the invention, object 118 may comprise, for instance, a bar, baton, club, rod, staff, stick, or other elongated, physical object. Although shown in FIG. 1 as having a cylindrical cross-section, object 118 may have a different cross-section (e.g., square or triangular cross-section, etc.) in different implementations. Further, object 118 may be rigid (e.g., made of wood, metal, hard plastic, etc.), or flexible (e.g., made of foam or other flexible material).

A VR controller 120 may be attached to object 118 (e.g., at a portion of the object substantially centered between first end 112 and second end 114). Alternatively, in various implementations, VR controller 120 may be attached to object 118 at various positions along the length of object 118 depending on how input controller 110 will be used with a VR game or application.

VR controller 120 may include one or more components (e.g., accelerometer, gyroscope, and other sensors) to determine the relative movement of object 118 (when attached thereto), including relative position, rotation, orientation, and/or other movement or positon data. According to an aspect of the invention, VR controller 120 may comprise any known or hereafter developed game controller for a VR system, and may be in operative communication with one or more other VR system components (described below) via a wired or wireless connection. For example, in one non-limiting implementation, VR controller 120 may comprise an HTC Vive wireless, hand-held controller. As detailed below, object 118 and the relative movement thereof may be depicted in a 3D virtual environment as part of a VR game and/or other VR application.

In one implementation, VR controller 120 may be removably coupled to the body of object 118 via adhesive tape, string, a mechanical fastener (e.g., a bracket, clamp, etc.), or via other removable attachment mechanisms. Alternatively, VR controller 120 may be permanently affixed to object 118.

In some implementations, VR controller 120 may be (removably or permanently) coupled to a household (or other) object such as, for example, a wooden stick, broom handle, foam roller, exercise baton, exercise bar, Nerf® Noodle or other object to turn the object into an input controller 110.

In some implementations, object 118 may be fabricated with its own integral VR controller component(s) (e.g., accelerometer, gyroscope, and other sensors).

Object 118 may vary in length (and/or cross-section) depending on the user. For example, object 118 may have a shorter length (and/or smaller cross-section) for younger or smaller users, and a longer length (and/or greater cross-section) for older or larger users. In some implementations, object 118 may include telescoping portions at either or both of first and second ends (112, 114) to enable its length to be adjusted.

In one implementation, object 118 may be configured to be grasped at a first portion and a second portion thereof by a user's hands during gameplay (described below). Depending on the game or application, there may be instances when a user is instructed to hold object 118 with one hand and/or both hands.

According to an aspect of the invention, with the VR controller 120 is coupled to object 118, input controller 110 may serve as a universal controller for use with any VR game or application wherein a cylindrical or other elongated object is used to interact with, for example, lights, animations, or other objects in a virtual environment. As such, a user may hold, move, swing, or otherwise manipulate object 118 to execute actions or commands without having to hold the actual VR controller 120.

Having provided the foregoing description of input controller 110, its use with an exemplary (and non-limiting) VR system will now be described.

Exemplary System Architecture

Figure 2:
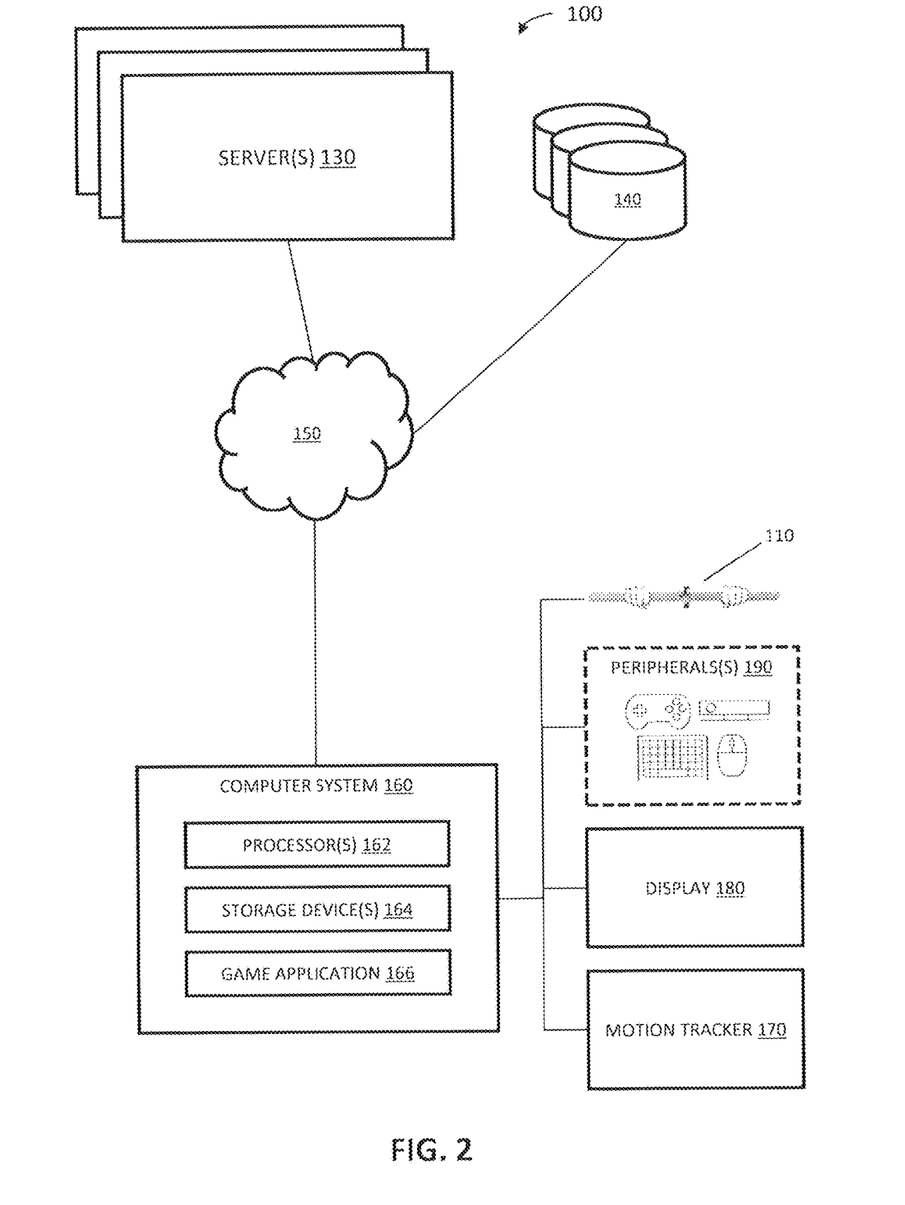
FIG. 2 illustrates an exemplary system architecture, according to an implementation of the invention.

FIG. 2 depicts an exemplary (and non-limiting) architecture of a system 100 which may include, for example, one or more servers 130, one or more databases 140, one or more computer systems 160, and/or other components.

Computer System 160

Computer system 160 may be configured as a gaming console, a handheld gaming device, a personal computer (e.g., a desktop computer, a laptop computer, etc.), a smartphone, a tablet computing device, a virtual reality headset, a head-mounted display, and/or other device that can be used to interact with an instance of a VR game. According to an aspect of the invention, computer system 160 may comprise any computer sufficiently powerful to run VR games or other applications (e.g., a gaming computer, a game console that is VR-enabled, a smartphone enabled headset and/or any other suitable computing system). Computer system 160 may be programmed with a VR operating system, and may have one or more VR applications or VR games loaded thereon, or otherwise available. Various VR headsets, VR controllers, and/or other peripherals may also be used with computer system 160.

Computer system 160 may include communication lines, or ports to enable the exchange of information with a network 150, and/or other computing platforms. Computer system 160 may include a plurality of hardware, software, and/or firmware components operating together to provide the functionality attributed herein to computer system 160. For example, computer system 160 may include one or more processors 162 (also interchangeably referred to herein as processors 162, processor(s) 162, or processor 162 for convenience), one or more storage devices 164 (which may store a VR game application 166 and data), and/or other components.

Processors 162 may be programmed by one or more computer program instructions. For example, processors 162 may be programmed by VR game or other VR application 166 and/or other instructions (such as gaming instructions used to instantiate the VR game).

The various instructions described herein may be stored in one or more storage devices 164 which may comprise random access memory (RAM), read only memory (ROM), and/or other memory. The storage device may store the computer program instructions to be executed by processor(s) 162 as well as data that may be manipulated by processor(s) 162. The storage device may comprise floppy disks, hard disks, optical disks, tapes, or other storage media for storing computer-executable instructions and/or data.

In some implementations, components of computer system 160 (e.g., a display, user interface, etc.) may be coupled to (e.g., wired to, configured to wirelessly communicate with) computer system 160 without being included in computer system 160.

Input Controller 110

As described in detail above with reference to FIG. 1, input controller 110 may comprise a universal controller for use with any VR game or application, and may be in operative communication with computer system 160 via a wired or wireless connection. In a multiplayer configuration, two or more input controllers 110 may be provided for use and enjoyment by multiple users.

Additional Peripherals 190

In addition to input controller 110, one or more additional peripherals 190 may be used to obtain an input (e.g., direct input, measured input, etc.) from player(s). Peripherals 190 may include, without limitation, a game controller, a gamepad, a keyboard, a mouse, an imaging device such as a camera, a motion sensing device, a light sensor, a biometric sensor, and/or other peripheral device that can obtain an input from a player. Peripherals 190 may be coupled to computer system 160 via a wired and/or wireless connection.

Display 180

Display 180 may comprise a computer screen, a smartphone screen, a TV screen, a projector screen, a head-mounted display, or wearable glasses.

In one implementation, display 180 may comprise a virtual reality headset that is worn on the head of a user. VR content may be presented to the user in a virtual space via a display included in the headset. The virtual reality headset may be configured such that a perception of a three-dimensional space is created by two stereoscopic movies, one generated for each eye, which are each being rendered in real time and then displayed. The convergence of these two movies in real time—one image to each eye (along with how those views are reactive to viewer head rotation and body posture in space)—may create a specific kind of immersive 3D effect and/or a sensation of presence in a 3D virtual world. Presenting VR content to the user in the virtual space may include presenting one or more views of the virtual space to the user. Although not separately illustrated, headphones may be utilized with a virtual reality headset and may be integral therewith or separate therefrom. Other sensory devices including haptics, olfactory devices, and/or other devices may be used.

Motion Tracker 170

Motion tracker 170 may be configured to track or sense the motion or gestures of a user and transmit data representative of the detected motion or gesture information to computer system 160. Additionally, motion tracker 170 may include facial recognition and/or voice recognition capability. Computer system 160 may control the virtual representation of the user in a virtual environment to exhibit substantially the same motion or gesture as that of the user (e.g., in substantially real time).

In one implementation, motion tracker 170 may include one or more of a camera, a sensor (e.g., a depth sensor), and a microphone. The sensor of the motion tracker 170 may include an infrared laser projector and a CMOS sensor.

Examples of motion tracker 170 may include, but are not limited to, the Microsoft Kinect motion sensing system, or a Sony PlayStation motion sensing camera. Motion tracker 170 may be operatively coupled to computer system 160 via a wired and/or wireless connection.

Server 130

In some implementations of the invention, a user may download one or more VR games or VR applications (e.g., VR game application 166) to computer system 160 from server 130. Server 130 may, for example, comprise a game server, and/or may host an app store or other online marketplace.

In some implementations, computer system 160 may function as a host computer that hosts gameplay between (or with) other devices, such as other computer system(s) 160. In yet other implementations, server 130 may function as a host computer that hosts gameplay between other devices, such as computer system(s) 160.

Server 130 may include one or more computing devices. Server 130 may include one or more physical processors programmed by computer program instructions, one or more storage devices (which may store, for example, one or more VR game applications), and/or other components.

Although each is illustrated in FIG. 2 as a single component, computer system 160 and server 130 may each include a plurality of individual components (e.g., computer devices) each programmed with at least some of the functions described herein. In this manner, some components of computer system 160 and/or server 130 may perform some functions while other components may perform other functions, as would be appreciated.

Network 150

The various components illustrated in FIG. 2 may be coupled to at least one other component via a network 150, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Databases 140

In some implementations, system 100 may comprise one or more databases 140. Databases 140 may comprise one or more such databases that reside in one or more physical devices and in one or more physical locations. The database may store a plurality of types of data and/or files and associated data or file descriptions, administrative information, or any other data.

Home Use and Location-Based Entertainment

The foregoing description of the various components comprising system architecture 100 is exemplary only, and should not be viewed as limiting. The invention described herein may work with various system configurations. Accordingly, more or less of the aforementioned system components may be used and/or combined in various implementations.

For example, system architecture 100 may vary depending on whether input controller 110 is used for VR gameplay in a home environment, in a Location-Based Entertainment (LBE) center such as a VR Arcade, or in another environment.

Home/Personal Use

For home (or personal) use, computer system 160 may be associated with a user, and the user may utilize input controller 110 (along with one or more of the other system components described above) with a VR game or VR application executing on computer system 160 in a home or other environment. As noted above, a user may download one or more VR games or VR applications (e.g., VR game application 166) to computer system 160 from server 130. Alternatively, server 130 may host gameplay, and may be accessible by (user) computer system 160 via network 150.

Location-Based Entertainment Centers

The location-based entertainment (LBE) industry, which includes family entertainment centers (FEC) and other types of community-based LBEs, is growing rapidly.

There are numerous reasons why VR Arcades, as one example, are increasing in popularity. One reason is that consumer VR can be expensive. While VR technology is becoming more affordable, VR's barrier to entry is a high one, particularly when more and more gear (e.g., headsets, peripherals, etc.) is acquired by users in an effort to more fully "immerse" themselves in the VR experience. A lack of space in most people's homes also presents challenges when attempting to design a quality room scale home VR experience. By contrast, with VR Arcades, users can access a plurality of different VR hardware and games for less cost than would be necessary to obtain the same experience in a home setting. Moreover, VR Arcades have clear social benefits, in that groups of friends, coworkers, etc. can come together to enjoy multiplayer VR.

Accordingly, in one implementation, system architecture 100 may be modified for use in a VR Arcade, regular arcade, or other LBE center. For example, in a VR Arcade, a number of game stations may be configured, each with its own computer system 160 and associated components (e.g., display 180, motion tracker 170, one or more input controllers 110, and/or additional peripherals 190).

In one implementation, server 130 may comprise a local (or in-house) server that hosts VR game titles and gameplay, executes VR Arcade management software, and/or performs other functions, and is operatively connected to each of the computer systems 160 in the VR Arcade for control/management purposes.

Moreover, in some implementations, a central server (or servers) (not pictured) may be coupled to the local (or in-house) servers 130 of each VR Arcade via, e.g., network 150. The central server may, for example, provide VR Arcades with access to a plurality of VR titles developed for use with input controller 110 for a flat rate (e g, similar to a subscription service), or other financial arrangement. In this regard, VR Arcade owners may acquire compelling VR content (e.g., a portfolio of titles utilizing the unique game mechanics designed for input controller 110) at a reasonable price.

In yet another implementation of the invention, one or more input controllers 110 may be packaged with one or more other system components (e.g., computer system 160, display 180, motion tracker 170, one or more additional peripherals 190, etc.) and offered as an arcade kit, complete with full industry grade enclosures. In one scenario, the arcade kit may be offered with an initial package of VR games (or other content) included with the purchase price, along with the ability to upgrade or acquire VR content at some predetermined interval (e.g, monthly) for an additional fee. Other monetization methods may be utilized.

Each of the foregoing examples are illustrative only, and should not be viewed as limiting. Multiple system configurations may be implemented.

Gameplay/Game Mechanics

As previously noted, a user can hold, move, swing, or otherwise manipulate input controller 110 in a plurality of different ways to execute game actions or commands without having to hold the actual VR controller 120. This versatility of input controller 110 enables it to be used with a variety of game mechanics for numerous VR game genres. While the examples described in detail below focus on music/rhythm-based games and exercise/fitness games, these games (and their associated game mechanics) should not be viewed as limiting.

Figure 3:
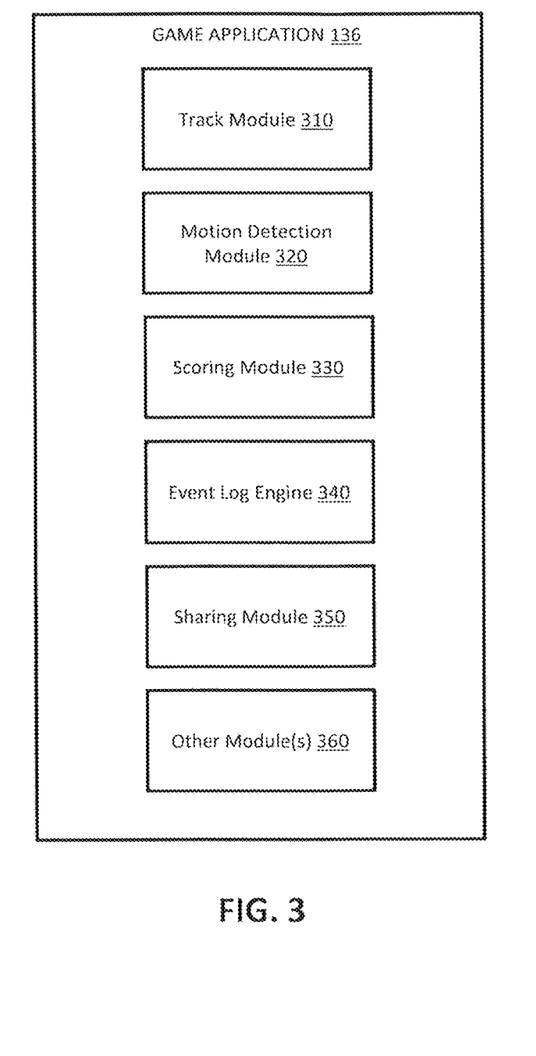
FIG. 3 illustrates exemplary modules comprising a VR game application, according to an implementation of the invention.

FIG. 3 depicts exemplary modules comprising a VR game application 136, according to an implementation of the invention. VR game application 136 may execute on computer system 160. Additionally or alternatively, VR game application 136 may run on a device such as a server 130.

In one non-limiting implementation, VR game application 136 may include a track module 310, motion detection module 320, scoring module 330, event log engine 340, sharing module 350, and/or other modules 360, each of which comprise instructions that program computer system 160 to perform various operations, each of which are described in greater detail below. As used herein, for convenience, the various instructions will be described as performing an operation, when, in fact, the various instructions program the processors 162 (and therefore computer system 160) to perform the operation.

Further, VR game application 136 may generate one or more virtual environments for gameplay, non-limiting examples of which are shown in FIGS. 4-7. Both object 118 and the relative movement thereof may be depicted in a 3D virtual environment as part of a VR game and/or other VR application. For example, a virtual environment may include a depiction of a staff or other similar in-game object representing the real-world object that is being used by a player. In some implementations, a user holding object may be depicted in a virtual environment as an avatar (e.g., in a third person VR implementation).

For ease of illustration, and with reference to the drawing figures, a real world item may be referred to herein using its dedicated reference character (e.g., object 118), while the corresponding virtual depiction of the item in a virtual environment may be referred to using the same reference character with a "prime" notation (e.g., object 118'). It should also be appreciated that aspects (e.g., colors, layouts, etc.) of a virtual environment (associated with gameplay) as described herein and depicted in FIGS. 4-8 are exemplary in nature, and should not be viewed as limiting.

One advantage of the invention is that an object 118, which may comprise a generic, every day, real-world, elongated, physical object (as noted above), may be depicted in a 3D virtual environment as a virtual object 118' with any number of variable characteristics (e.g., size, shape, appearance, etc.) depending on the nature of the VR game or application with which it is used. In this regard, a gamer does not have to spend a considerable sum on a "fancy" VR peripheral, when object 118 may be depicted as a virtual object 118' that may be customized in-game (or in-app) in practically limitless ways.

In the following examples, real-world object 118 (and corresponding virtual object 118') may be used interchangeably with input controller 110 (and corresponding virtual input controller 110'), respectively. It should be appreciated, as noted above, that object 118 becomes input controller 110 when VR controller 120 is attached thereto.

Rhythm Game Example

Figure 4:
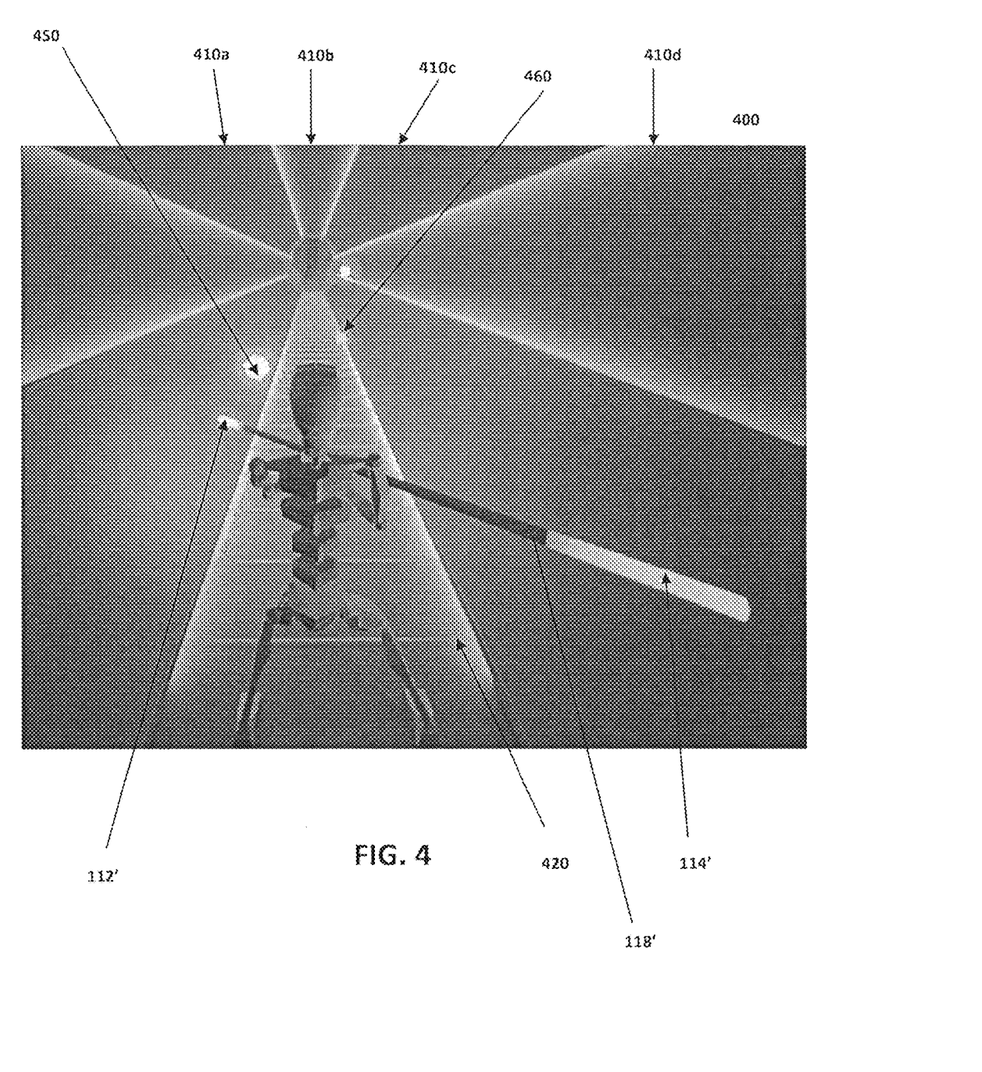
FIG. 4 depicts an exemplary virtual environment generated by a VR game application, according to an implementation of the invention.

In one implementation of the invention, VR game application 136 may comprise a "rhythm game." With reference to FIG. 4, a 3D graphical environment 400 may include a tunnel (or tube or passage) defined by any number of planes (410a, 410b, 410c, . . . 410n) (or sides or segments, etc.). One such plane may comprise a runway 420 (or lane, or pathway, etc.). As noted above, a user holding input controller 110 (which includes object 118) may be depicted in environment 400 as an avatar (in a third person VR implementation) holding a similarly-shaped object 118' (depicted as a staff or other in-game item). Alternatively, in a first person VR implementation, only object 118' may be shown in the virtual environment.

According to an aspect of the invention, during gameplay, first and second ends (112', 114') of object 118' may have a visual correspondence (e.g., in shape, appearance (e.g., color), texture, etc.) to a series of objects (which may also be referred to herein as visual markers, cues, prompts, symbols, particles, etc.) in 3D space that travel toward the user along the direction of runway 420. To score, a user must manipulate real-world object 118 so that a predetermined portion of virtual object 118' in environment 400 intercepts (e.g., catches, hits, overlays a portion of, or otherwise contacts) the matching objects as established by the visual correspondence.

Using color as a non-limiting example, first end 112' of object 118' may comprise a first color (e.g., red), while second end 114' may comprise a second color (e.g., blue). The colors of the ends of virtual object 118' may be solid, and/or include some effect (e.g., glowing, pulsing, etc.). The series of objects traveling toward the user in 3D space (along the direction of runway 420) may include both red objects 450 as well as blue objects 460. To score, a user must manipulate real-world object 118 so that virtual object 118' in environment 400 intercepts (e.g., catches, hits, overlays a portion of, or otherwise contacts) red objects 450 with the corresponding, matching red-colored end 112' of object 118' as they pass by, and likewise intercepts blue objects 460 with the corresponding, matching blue-colored end 114' of object 118' as they pass by.

Although not illustrated in FIG. 4, a center portion of virtual object 118' may have a "catcher" (or basket, or loop) of a third color (e.g., yellow). In addition to trying to intercept red and blue objects with the respective matching colored ends (112', 114') of object 118', a user may have to try and "catch" yellow objects (which are included in the series of colored objects traveling toward the user along the direction of runway 420) in the catcher of object 118' as well.

In some instances, shapes may be used to establish a visual correspondence between first and second ends (112', 114') of virtual object 118' and the series of objects that travel toward the user along the direction of runway 420. For instance, first end 112' of virtual object 118' may comprise a square shape, while second end 114' may comprise a triangular shape. The series of objects traveling toward the user along the direction of runway 420 may include both squares and triangles. To score, a user must manipulate real-world object 118 so that virtual object 118' in environment 400 intercepts squares with the corresponding, matching square-shaped end 112' of object 118' as they pass by, and intercepts triangles with the corresponding, matching triangular-shaped end 114' of virtual object 118' as they pass by. Other shapes and/or methods for establishing a visual correspondence between virtual object 118' and the game objects may be used.

In some implementations, the visual correspondence between the game objects and the ends (112', 114') of object 118' may change mid-game. For instance, continuing with the color example above, first end 112' of virtual object 118' may change from a first color to a second color (e.g., red to green) at some point during a game session, while second end 114' may change from a first color to second color (e.g., blue to white) at the same time during gameplay or at a different time. The series of objects traveling toward the user along the direction of runway 420 will then likewise change (e.g., from red to green, and from blue to white). Further, colors may also change to different-shaped objects and back to colors to keep a user engaged. Numerous configurations may be implemented to keep gameplay challenging.

Figure 5:
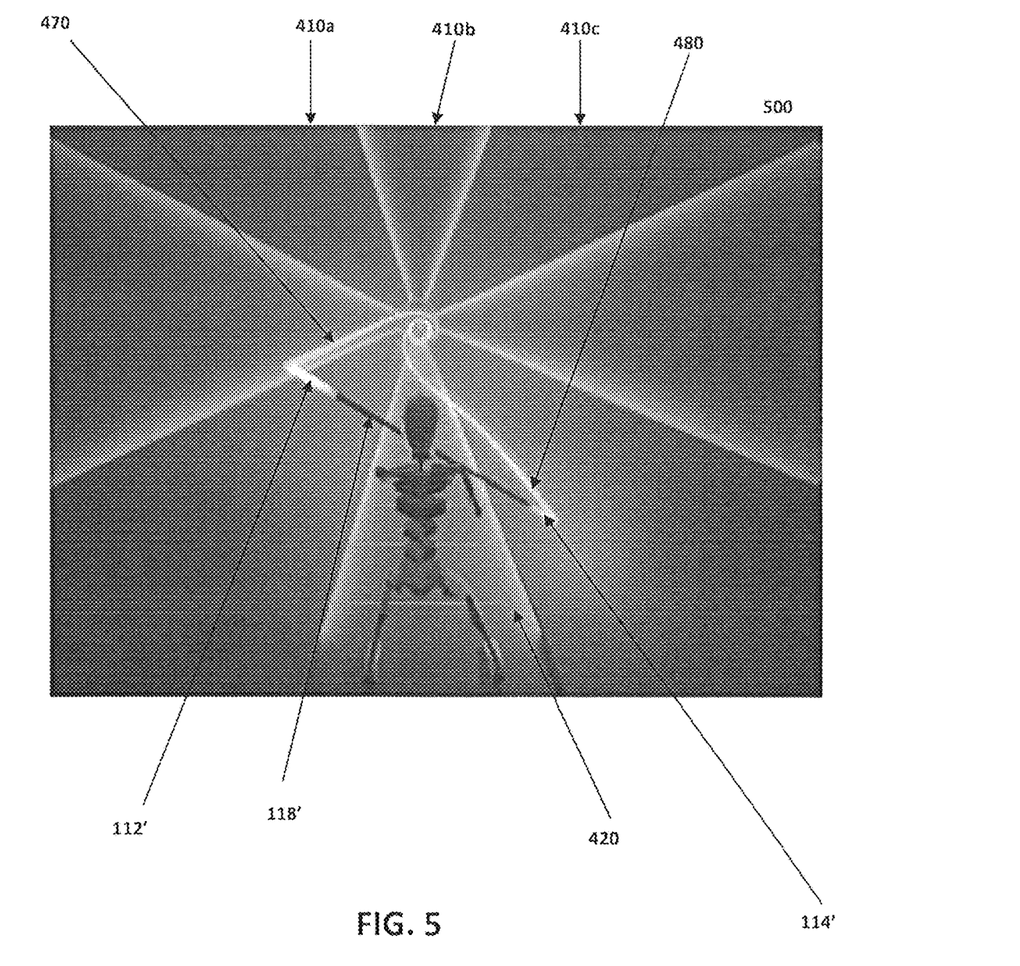
FIG. 5 depicts an exemplary virtual environment generated by a VR game application, according to an implementation of the invention.

In one implementation of the invention, with reference to FIG. 5, one or more fibers (used interchangeably with tubes, ribbons, wires, threads, strings, strands, etc.) of various cross-section and length may be used as visual cues in lieu of the objects shown in FIG. 4. For example, and continuing again with color as a non-limiting example, first end 112' of object 118' may comprise a first color (e.g., red), while second end 114' may comprise a second color (e.g., blue). One or more red fibers 470 and blue fibers 480 may travel toward the user along the direction of runway 420. To score, a user must manipulate real-world object 118 so that virtual object 118' in environment 400 intercepts (e.g., catches, hits, overlays a portion of, or otherwise contacts) the red fibers 470 with the corresponding, matching red-colored end 112' of virtual object 118' as they pass by, and intercept the blue fibers 460 with the corresponding, matching blue-colored end 114' of object 118' as they pass by.

An object of the game is to intercept as many objects (FIG. 4) or fibers (FIG. 5) as possible, with the correct ends of object 118', within a predetermined time interval (e.g., 3-5 minutes). A player's score may increase with each correctly-intercepted object. In some instances, a player may lose points for each object that he or she is unable to intercept.

In some implementations, the virtual depiction of object 118' (along with a user's avatar if presented) may be located at a fixed position along runway 420 at which to intercept objects. In other implementations, a user may move forward along runway 420 in an effort to "close the distance" on objects scrolling toward him or her, or backward along runway 420 to "buy more time" before an object is to be intercepted. A successful intercept may be worth a predetermined value if it occurs while the user is stationary, a greater value if it occurs while a user is moving toward (or "charging") the object, or a lesser value if it occurs while a user is moving backward (or "retreating") from the object. Various scoring methodologies may be implemented.

In one implementation, a visual cue may change shape or appearance to convey that it has been successfully intercepted by a user (using the input controller). For example, with reference to FIG. 6, objects may "explode" or "expand" into a graphic design or pattern 610, 620 (or otherwise change shape, color, or other visual appearance attribute) if successfully intercepted by the first and second ends of object 118' respectively.

In a multiplayer mode, a second runway 420 may be depicted parallel (or otherwise proximal) to runway 420 in environment 400, and a second series of objects may travel toward the second user along the direction of second runway 420 so that two users can compete side by side. Additional runways may be included in a similar manner for additional users in a multiplayer setting.

The use of input controller 110 with VR game application 136 is advantageous in that it may increase the mobility of a user, as well as a user's sight-reflex coordination. Game application 136 is designed to be accessible across multiple skill levels (e.g., beginner, intermediate, expert) and demographics, and provides gamers with an "easy to learn, yet difficult to master" game mechanic that proves exciting and desirable for all gamer skill levels. For example, as a user progresses through various game levels, the complexity of the game may increase with a greater number of objects being directed toward the user along the direction of runway 420 at a faster rate.

With reference back to FIG. 3, track module 310 may enable developers (or other users) to create or store tracks for gameplay. A track may comprise the series of objects (visual markers, cues, prompts, symbols, particles, etc.) described above, that travel toward the user along the direction of runway 420 during gameplay. Tracks may differ in duration, and number/frequency of objects depending on the intended skill level (e.g., beginner, intermediate, expert, etc.). In some implementations, tracks may comprises only visual data (e.g., cues), or both visual and audio data (e.g., a music track). The scrolling cues may correspond to (or synch with) beats in the selected music track.

In one aspect of the invention, track module 310 may comprise a music library, featuring tracks for gameplay that correspond to popular music artists and genres. In one example, a track may comprise a song by a popular artist, having a synchronized series of visual cues, as well as artist voiceovers, appearances, artwork, and/or other visual assets that appear in the virtual environment during gameplay. For example, a popular DJ may appear in the virtual environment and "throw" beats at a user for him or her to intercept. These types of tracks may, for example, be made available for in-game purchase, or download via an app store or other on-line marketplace, or via another channel of commerce, which may create a new revenue stream for artists. In yet other implementations, some tracks may be sponsored by athletes, brands, or other types of celebrities or entities. Numerous possibilities exist.

During gameplay, the movements of object 118 as well as the user are detected and translated to the virtual environment. Motion detection module 320 may receive input(s) from input controller 110 and/or motion tracker 170, and use the received inputs to determine whether a user has correctly manipulated input controller 110 to intercept the objects (visual cues) associated with a given track in the virtual environment as described in detail above.

Scoring module 330 scores gameplay based on the information determined by motion detection module 320.

In one implementation, an event log engine 340 may record gameplay state information during gameplay. The gameplay state information may include input controller movements, other user inputs and commands and associated timing information of the input controller movements and commands for one or more players, audio/video information, positions and attributes of avatars and objects, depiction of surrounding game environment and conditions, and any other type of game state information that may be used to recreate the game state for any given time or period of time of a gameplay session. The event log engine may capture gameplay state information continuously, or in predetermined segments, and the captured gameplay state information may be stored in one or more databases.

Sharing module 350 may enable a player to share video of gameplay, or other information (e.g., gameplay statistics, etc.) internally (in-game) via, for example, an in-game social network or a game publisher-centric social network accessible by game players.

Additionally or alternatively, sharing module 350 may enable a player to share video of gameplay, or other information (e.g., gameplay statistics, etc.) via one or more external social networks (e.g., Facebook, Google+, Twitter, Instagram, Vine, Tumblr, etc.).

In one implementation of the invention, sharing module 350 may enable a player to transmit communications (e.g., email messages, text messages, or other electronic communications) that include hyperlinks or other selectable graphical user interface objects that enable recipients to access the shared information.

Shape-Fitting Game

In one implementation of the invention, VR game application 136 may comprise a "shape-fitting game." Similar to the rhythm game example described above, and with reference to FIG. 7, a 3D graphical environment 700 may include a depiction of a staff or other similar in-game object 118' representing the real-world object 118 that is being used by a player. Although not shown in FIG. 7, a user holding object 118 may be depicted in environment 700 as an avatar (in a third person VR implementation).

Figure 6:
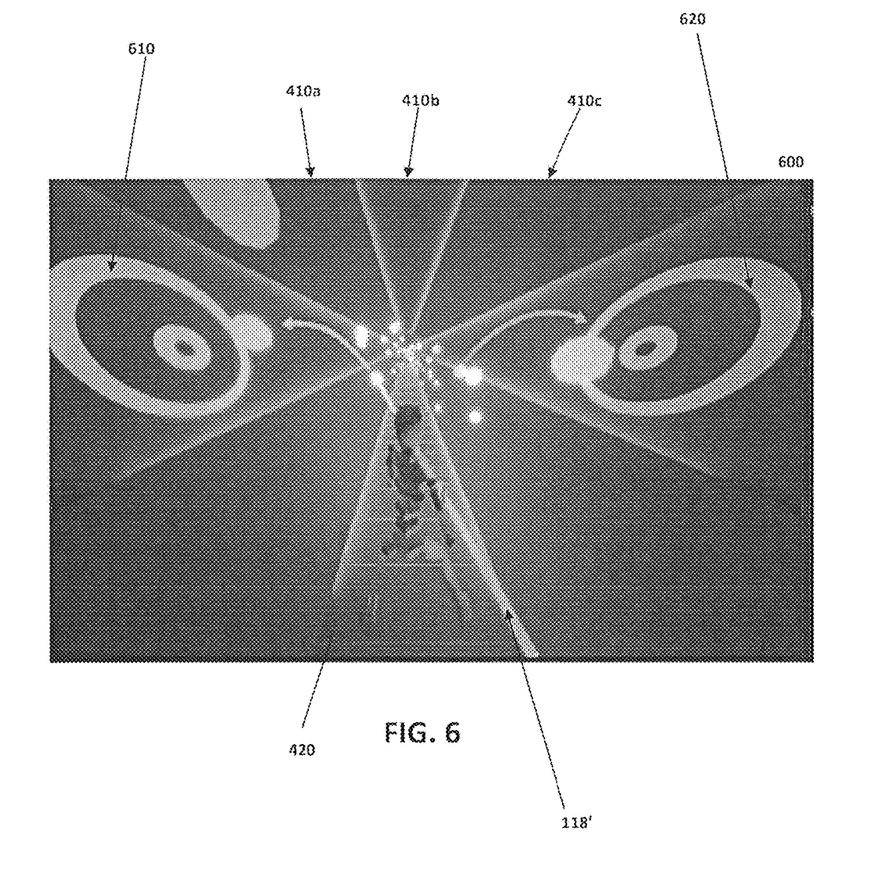
FIG. 6 depicts an exemplary virtual environment generated by a VR game application, according to an implementation of the invention.

During gameplay, a series of shapes (or objects) (710a, 710b, 710c, . . . 710n) may travel toward a user in the virtual environment along the direction of a runway or other path (e.g., similar to runway 420 in FIGS. 4-6). The shapes, which may differ in size, configuration, layout, etc., may be substantially solid with the exception of a space that enables the passage of object 118' completely therethrough.

Figure 7:
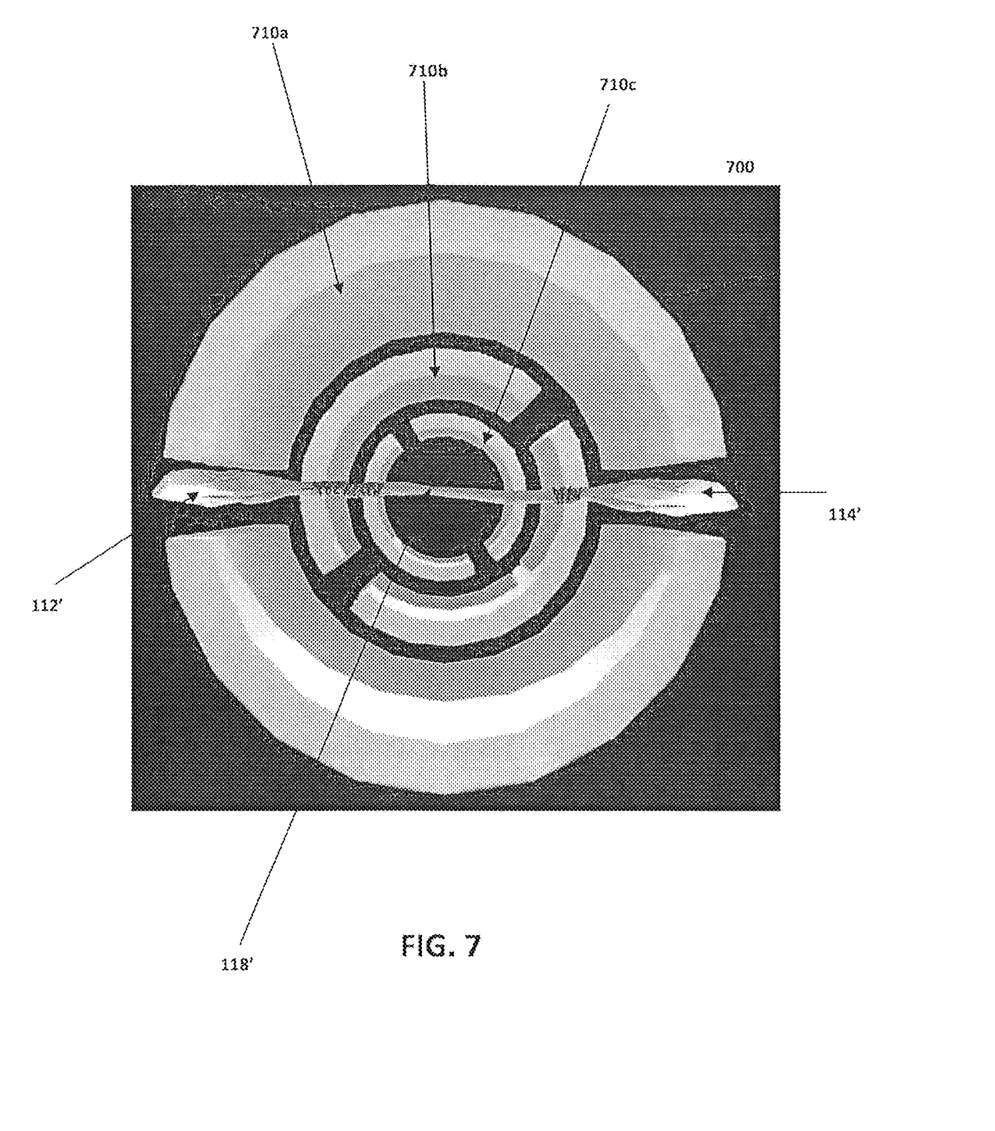
FIG. 7 depicts an exemplary virtual environment generated by a VR game application, according to an implementation of the invention.
Figure 8:
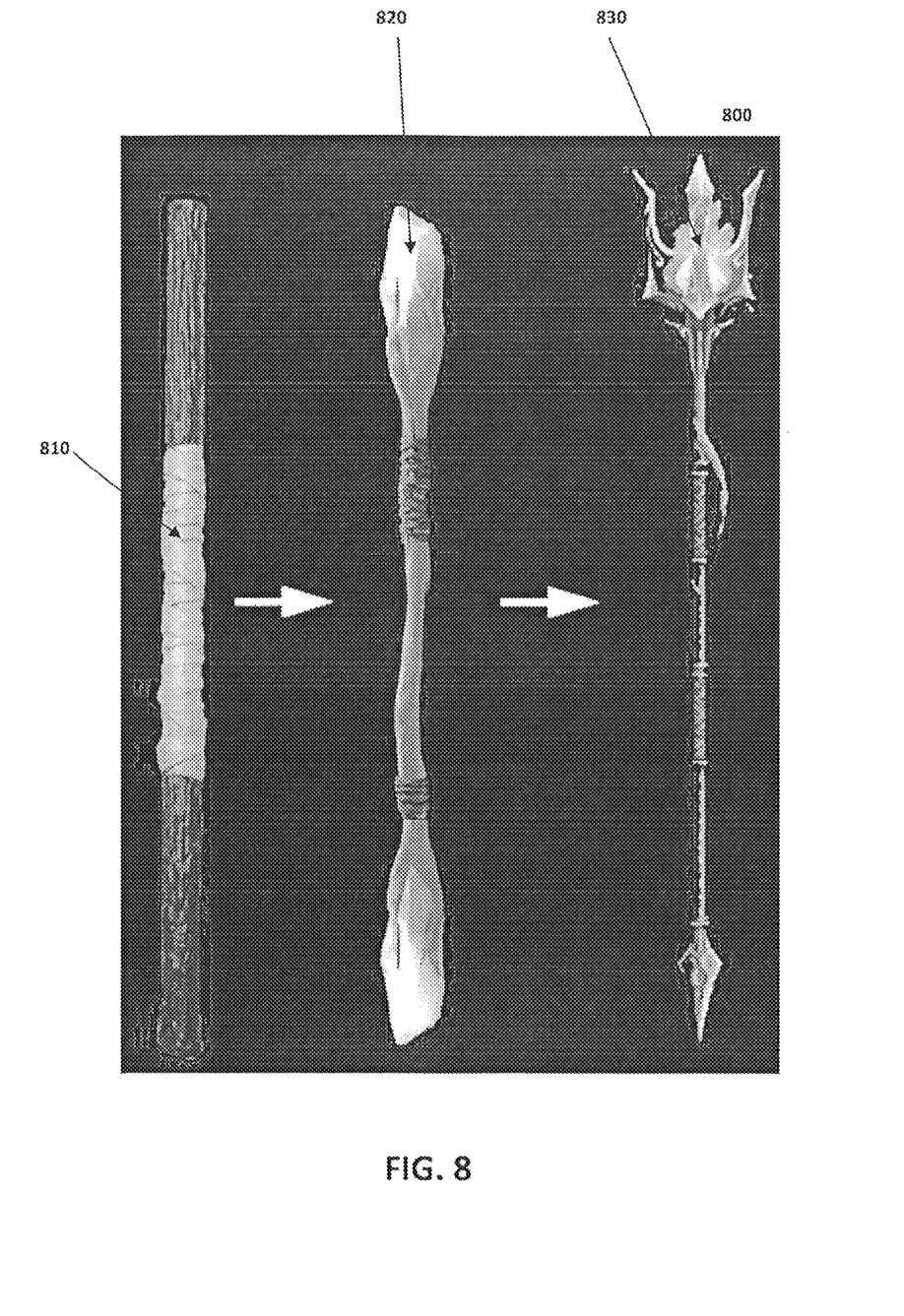
FIG. 8 depicts an exemplary virtual environment generated by a VR game application, according to an implementation of the invention.

In the example depicted in FIG. 7, shapes 710a, 710b, 710c are shown as circles, each having a cut-out at a predetermined orientation that permits passage of the virtual object 118' therethrough. To score, a user must manipulate real-world object 118 so that virtual object 118' in environment 700 passes through the cut-out in each object 710a, 710b, 710c, while avoiding contact with each object, as each object passes by the user. The objects 710a, 710b, 710c may be spaced apart from one another by varying distances, and may scroll toward the user at different speeds depending on skill level (e.g., beginner, intermediate, expert). Each game may last a predetermined time interval (e.g., 3-5 minutes). A player's score may increase with each object that is "cleared" (e.g., for which object 118' passes therethrough). In some instances, a player may lose points for each object that he or she is unable to clear.

In some implementations, the graphical depiction of object 118' (along with a user's avatar if presented) may be located at a fixed position along a runway at which to clear objects. In other implementations, a user may move forward along the runway in an effort to "close the distance" on objects scrolling toward him or her, or backward along the runway to "buy more time" to clear an object. A successful clear may be worth a predetermined value if it occurs while the user is stationary, a greater value if it occurs while a user is moving toward (or "charging") the object along the runway, or a lesser value if it occurs while a user is moving backward (or "retreating") from the object along the runway. Various scoring methodologies may be implemented.

The use of input controller 110 with VR game application 136 is advantageous in that it may increase the mobility of a user, as well as a user's sight-reflex coordination. Game application 136 is designed to be accessible across multiple skill levels (e.g., beginner, intermediate, expert) and demographics, and provides gamers with an "easy to learn, yet difficult to master" game mechanic that proves exciting and desirable for all gamer skill levels. For example, as a user progresses through various game levels, the complexity of the game may increase with a greater number of objects being directed toward the user along the direction of the runway that he or she must clear at a faster rate.

In one implementation, an object 710a, 710b, or 710c may change shape or appearance to convey that it has been successfully cleared by a user (using the input controller). For example, the object may "explode" or "expand" into a graphic design or pattern (or otherwise change shape, color, or other visual appearance attribute) if successfully cleared by the first and second ends of input controller 110 respectively.

In a multiplayer mode, a second runway may be depicted parallel (or otherwise proximal) to the runway in environment 700, and a second series of objects may travel toward the second user along the direction of the second runway so that two users can compete side by side. Additional runways may be included in a similar manner for additional users in a multiplayer setting.

In some implementations in which a user is also depicted in environment 700 as an avatar (in a third person VR implementation), one or more of the objects 710a, 710b, 710c scrolling toward the user may be substantially solid with the exception of a space that enables the passage of both the avatar and the object 118' completely therethrough. In other words, an object may have a body-shaped "cut out" or pattern, as well as a cut-out at a predetermined orientation for object 118'. In this regard, to score, a user must position his or her body so that the corresponding avatar in environment 700 passes through the body-shaped "cut out" or pattern, and also manipulate real-world object 118 so that virtual object 118' in environment 700 passes through the cut-out in each object 710a, 710b, 710c, while avoiding contact with each object, as each object passes by the user. Other variations may be implemented.

The exemplary modules comprising VR game application 136 for the "shape-fitting" game may be the same as those described in detail above with regard to FIG. 3 for the rhythm-based game. For example, track module 310 may enable developers (or other users) to create or store tracks for gameplay. A track may comprise the series of objects described above, that travel toward the user along the runway to be "cleared." Tracks may differ in duration, and number/frequency of objects depending on the intended skill level (e.g., beginner, intermediate, expert, etc.).

During gameplay, motion detection module 320 may receive input(s) from input controller 110 and/or motion tracker 170, and use the received inputs to determine whether a user has correctly manipulated input controller 110 (and/or his or herself) in 3D space to clear the objects associated with a given track.

Scoring module 330 scores gameplay based on the information determined by motion detection module 320. In one implementation, an event log engine 340 may record gameplay state information during gameplay. Sharing module 350 may enable a player to share video of gameplay, or other information (e.g., gameplay statistics, etc.) internally (in-game) or externally via one or more external social networks (e.g., Facebook, Google+, Twitter, Instagram, Vine, Tumblr, etc.) as described above.

The foregoing rhythm-based and "shape-fitting" games are illustrative only, and not intended to be limiting. In one implementation, for example, a hybrid rhythm-based and "shape-fitting" games may be provided combining the game mechanics of each as described above.

In either game, users may progress and "unlock" content through the achievement of certain benchmarks during gameplay. For example, with reference to FIG. 8, a user's input controller 110 may be depicted in-game as a staff, which itself may become more elaborate (e.g., transition from staff 810, to staff 820, to staff 830) etc. as certain benchmarks are achieved (scores obtained, levels "unlocked" and cleared, etc.). A user may build his or her own staff in VR, purchase special staffs in-game or via an app store etc., and may earn power-ups, shields, and any number of in-game benefits via certain gameplay actions.

By way of example, the system may include various options for powerups. According to one example, upon the occurrence of a certain condition (e.g., at a certain time in the game, upon the occurrence of a certain event in the game or upon the occurrence of other conditions), the game state may be operable (e.g., for a certain period of time) to provide a power up. When the game state is so operable, it may cause information about the state, the remaining duration of the state and/or award to be displayed to the user.

As one example, satisfying a certain set of conditions can cause movement of the virtual object 118' to leave a trail that has functional significance to the gamer play. The condition may be that the user contacts a certain colored object or pattern of colors of objects. Optionally, the user may be required to make such contact with a specified portion of the virtual object 118' (e.g., a particular end, the middle or other specified portion). Upon doing so, the game state may change to be operable such that the object 118 can be moved in a rapid fashion and the virtual object 188" will appear to leave a trail corresponding to the motion for a certain period of time. When this occurs, if displayed objects (e.g., colored objects) traveling toward the user are contacted by the "trail" (and not just the actual end of the virtual object 118') the user will be deemed to have contacted the displayed object. In this way, the trail powerup makes it easier to hit the displayed objects or a group of displayed objects as they move toward the user. According to one embodiment, this power up may correspond to hitting a certain colored object, with a certain portion of the virtual object 118'. For example, the virtual object may have one end that is blue and one that is yellow. The particular colored object (e.g., green) may appear and require the user to hit it with a center portion of the virtual object 118' to activate the power up. The game engine may be programmed such that the green object may appear before a large grouping of blue and/or yellow objects. Activating the trail powerup may be an easier way to contact all of the large group of objects. Of course the specific colors and requirements can vary for this power up.

According to another example power up, satisfying a certain set of conditions can cause time in the game to slow down (e.g. slow the rate at which colored objects travel towards a user). The condition may be that the user contacts a certain colored object or pattern of colors of objects. Optionally, the user may be required to make such contact with a specified portion of the virtual object 118' (e.g., a particular end, the middle or other specified portion). Upon doing so, the game state may change to be operable such that time in the game to slows down for some time. In this way, the time powerup makes it easier to hit the displayed objects or a group of displayed objects as they move toward the user. According to one embodiment, this power up may correspond to hitting a certain colored object, with a certain portion of the virtual object 118'. For example, the virtual object may have one end that is blue and one that is yellow. The particular colored object (e.g., green) may appear and require the user to hit it with a center portion of the virtual object 118' to activate the power up. The game engine may be programmed such that the green object may appear before a large grouping of blue and/or yellow objects. Activating the time powerup may be an easier way to contact all of the large group of objects. Of course the specific colors and requirements can vary for this power up.

According to another example power up, satisfying a certain set of conditions can cause the virtual object 118' to become relatively larger (e.g., 1.5-5×) than prior to the powerup for a period of time. The condition may be that the user contacts a certain colored object or pattern of colors of objects and/or that the user must move the virtual object in a predetermined pattern. Optionally, the user may be required to make such contact with a specified portion of the virtual object 118' (e.g., a particular end, the middle or other specified portion). Upon doing so, the game state may change to be operable such that virtual object 118' to become relatively larger. In this way, this powerup makes it easier to hit the displayed objects or a group of displayed objects as they move toward the user. According to one embodiment, this power up may correspond to hitting a certain colored object, with a certain portion of the virtual object 118' and/or that the user must move the virtual object in a predetermined pattern. For example, the virtual object may have one end that is blue and one that is yellow. The particular colored object (e.g., green) may appear and require the user to hit it with a center portion of the virtual object 118' to activate the power up. The game engine may be programmed such that the green object may appear before a large grouping of blue and/or yellow objects. Alternatively or in addition, the predetermined pattern may correspond to a simulated rowing motion with the object 118. Activating the time powerup may be an easier way to contact all of the large group of objects. Of course the specific colors and requirements can vary for this power up. The speed of the motion (e.g., rowing action) may impact the increase in size. For example, engaging in the required motion may generate a display of a circle near the ends of the stick. The size of the circle may increase with the speed and/or frequency of the motion.

Each of the powerups may have activating conditions and powerup characteristics. The activating conditions for each of the power up characteristics can include any of the examples described herein and reasonable alternatives. The foregoing are examples only.

By way of example, other activating conditions can include a user drawing certain patterns (e.g., a shield) on the ground with the virtual object 118' at certain times (e.g., when prompted by the game display). According to this power up, the game state may change to be operable such that a shield is displayed in a certain region to block and colored objects as they move toward the user to prevent the user from having to contact those colored objects with the virtual object 118' or perform other shield functions.

Exemplary Flowchart

Figure 9:
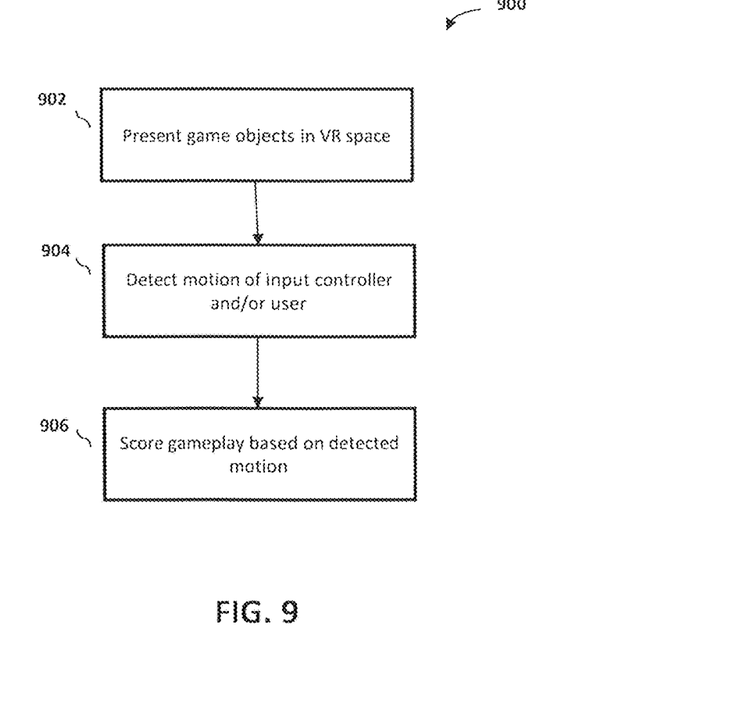
FIG. 9 depicts an exemplary flowchart of processing operations, according to an implementation of the invention.

FIG. 9 depicts an exemplary flowchart of processing operations, according to an implementation of the invention. The various processing operations and/or data flows depicted in FIG. 9 are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagram. One or more operations may be performed simultaneously. Accordingly, the operations as illustrated (and described in greater detail below) are exemplary by nature and, as such, should not be viewed as limiting.

In an operation 902, game objects are presented to a user in VR space. In a rhythm-based VR game, a series of game objects (visual markers, cues, prompts, symbols, particles, etc.) may travel toward a user along a runway during gameplay. A game objective is for the user to correctly manipulate input controller to intercept the objects (visual cues) in VR space as described in detail herein with regard to FIGS. 4-6. In a shape-fitting game, the game objects may comprise a series of shapes (which may differ in size, configuration, layout, etc.) that are substantially solid with the exception of a space that enables the passage of a visual depiction of the input controller and/or a human form completely therethrough. A game objective is for the user to position the controller and/or his or her body in 3D space so as to enable either or both to pass through a cut-out in each object as each object passes by the user as described in detail herein with regard to FIG. 7.

In an operation 904, during gameplay, input(s) may be received from the input controller and/or a motion tracker and analyzed to determine whether a user has correctly manipulated the input controller and/or his or her body in 3D space to intercept or clear the objects associated with a given track.

In an operation 906, gameplay is scored based on the information determined in operation 904.

Other implementations, uses and advantages of the invention will be apparent to those skilled in the art from consideration of the specification and practice of the invention disclosed herein.

What is claimed is:

1. A system configured to facilitate user interaction with a virtual environment, wherein user interaction with the virtual environment is based on movement of an input device, the system comprising:
   an input device comprising an elongated object and a controller component coupled to the elongated object, the elongated object comprising a first end and a second end, and wherein the controller component comprises one or more sensors configured to detect movement of the input device; and
   a computer having one or more physical processors programmed with one or more computer program instructions that, when executed by the one or more physical processors, program the computer to:
   generate images of a virtual environment that include a virtual depiction of the elongated object, wherein the virtual environment comprises a virtual reality game, and wherein the virtual depiction of the elongated object comprises a first visual indicator and a second visual indicator, wherein the first visual indicator corresponds to the first end of the elongated object and the second visual indicator corresponds to the second end of the elongated object;
   generate images depicting a series of virtual objects that appear to travel toward a user down one of one or more predefined passages in the virtual environment, wherein each of the virtual objects comprises one of a set of visual characteristics, the set of visual characteristics including at least a first visual characteristic that corresponds to the first visual indicator and a second visual characteristic that corresponds to the second visual indicator, wherein the first visual characteristic is different than the second visual characteristic;
   receive input from the controller component indicating movement of the input device;
   cause the virtual depiction of the elongated object to move in the virtual environment based on the movement of the input device;
   determine that a number of a set of game objectives has been completed based on the virtual depiction of the elongated object; and
   determine a score based on the number of the set of game objectives that has been completed.

2. The system of claim 1, wherein the computer is further programmed to:
   determine a number of the series of virtual objects that comprise the first visual characteristic that are intercepted by the first visual indicator, wherein a virtual object is intercepted by the first visual indicator when a position of a first end of the virtual depiction of the elongated object is within a proximity of a position that corresponds with the end of the predefined passage of the virtual object at a predefined time;
   determine a number of the series of virtual objects that comprise the second visual characteristic that are intercepted by the second visual indicator; and
   determine the number of the set of game objectives that has been completed based on the number of the series of virtual objects that comprise the first visual characteristic that are intercepted by the first visual indicator and the number of the series of virtual objects that comprise the second visual characteristic that are intercepted by the second visual indicator, wherein the score indicates the number of the virtual objects that have been intercepted by an end of the virtual depiction of the elongated object that corresponds with a visual characteristic of each virtual object.

3. The system of claim 1, wherein the system is further programmed to:
   determine that one or more conditions associated with a modified game state have been satisfied;
   activate the modified game state based on the determination that the one or more conditions have been satisfied, wherein the modified game state causes the virtual depiction of the elongated object to move more rapidly in the virtual environment based on the movement of the input device; and cause an indication that the modified game state has been activated to be provided to the user.

4. The system of claim 1, wherein the computer is further programmed to:

receive user input indicating a selection of a song; and cause the images of the series of virtual objects to appear to travel toward the user based on the selected song.

5. The system of claim 1, wherein the system further comprises a second input device comprising a second elongated object and a second controller component coupled to the second elongated object, wherein the images of the virtual environment further include a virtual depiction of the second elongated object, wherein the computer is further programmed to:

detect movement of the input device and the second input device simultaneously;

cause the virtual depiction of the second elongated object to move in the virtual environment based on the movement of the second input device;

determine a second number of the set of game objectives that has been completed based on a number of the virtual objects that has been intercepted by an end of the virtual depiction of the second elongated object that corresponds with a visual characteristic of each virtual object; and determine a second score based on the second number of the set of game objectives that has been completed.

6. The system of claim 1, further comprising a virtual reality headset configured to be worn on the head of the user and present virtual reality content via a display of the virtual reality headset, wherein the virtual reality content comprises the virtual reality game.

7. The system of claim 1, wherein the computer is further programmed to:

generate an image of a virtual representation of the user to be depicted in the virtual environment, wherein the images of the virtual environment include the image of the virtual representation of the user.

8. The system of claim 7, further comprising a motion tracker, wherein the motion tracker is configured to:

detect motion or gestures of the user; and transmit data representative of the detected motion or gestures to the computer, wherein the computer is configured to manipulate the image of the virtual representation of the user based on the data representative of the detected motion or gestures of the user.

9. The system of claim 1, wherein the computer is further programmed to:

receive user input indicating a request to modify the virtual depiction of the elongated object;

generate an updated virtual depiction of the elongated object based on the request; and cause the updated virtual depiction of the elongated object to be depicted in the virtual environment.

10. The system of claim 1, wherein the computer is further programmed to:

cause gameplay of the virtual reality game to be recorded;

receive user input indicating a request to share the recorded gameplay via social media; and cause the recorded gameplay to be shared via social media responsive to the request.

11. The system of claim 1, wherein the controller component is permanently coupled to the elongated object.

12. The system of claim 1, wherein the controller component is removably coupled to the elongated object.

13. The system of claim 12, wherein the elongated object may be substituted for a second elongated object.

14. The system of claim 13, wherein the second elongated object comprises a wooden stick, a broom handle, a foam roller, an exercise baton, or an exercise bar.

15. The system of claim 1, wherein the elongated object comprises one or more telescoping portions at the first end of the elongated object and/or the second end of the elongated object, the one or more telescoping portions configured adjust the length of the elongated objected.

16. The system of claim 1, wherein the elongated object comprises a first portion configured to be grasped by a first hand of a user and a second portion configured to be grasped by a second hand of the user.

17. The system of claim 1, wherein the first visual characteristic comprises a first color and the second visual characteristic comprises a second color different than the first color.

18. The system of claim 2, wherein the first visual indicator comprises the first visual characteristic and the second visual indicator comprises the second visual characteristic.

19. The system of claim 18, wherein the first end of the elongated object does not comprise the first visual characteristic.

* * * * *